United States Patent
Xu et al.

(10) Patent No.: US 12,461,392 B2
(45) Date of Patent: *Nov. 4, 2025

(54) SMART HEAD-MOUNTED DEVICE

(71) Applicant: Goertek Inc., Shandong (CN)

(72) Inventors: Tongyan Xu, Weifang (CN);
Chengxiang Zhai, Weifang (CN)

(73) Assignee: Goertek Inc., Shandong (CN)

( * ) Notice: Subject to any disclaimer, the term of this patent is extended or adjusted under 35 U.S.C. 154(b) by 741 days.

This patent is subject to a terminal disclaimer.

(21) Appl. No.: 17/635,136

(22) PCT Filed: Dec. 26, 2019

(86) PCT No.: PCT/CN2019/128555
§ 371 (c)(1),
(2) Date: Feb. 14, 2022

(87) PCT Pub. No.: WO2021/027229
PCT Pub. Date: Feb. 18, 2021

(65) Prior Publication Data
US 2022/0326550 A1     Oct. 13, 2022

(30) Foreign Application Priority Data
Aug. 14, 2019   (CN) .......................... 201910750650.0

(51) Int. Cl.
*G02C 11/00*       (2006.01)
*A61F 9/02*        (2006.01)
(Continued)

(52) U.S. Cl.
CPC .............. *G02C 11/10* (2013.01); *H04R 1/02* (2013.01); *H04R 1/1058* (2013.01)

(58) Field of Classification Search
CPC .......... G02C 11/06; G02C 11/00; G02C 7/02; G02C 7/04; G02C 5/00; G02C 5/143;
(Continued)

(56) References Cited

U.S. PATENT DOCUMENTS

| 10,353,221 B1 * | 7/2019 | Graff .................... G02C 5/2209 |
| 10,609,465 B1 * | 3/2020 | Wakeland ............ H04R 1/2888 |

(Continued)

FOREIGN PATENT DOCUMENTS

| CN | 103181191 A  | 6/2013 |
| CN | 204377095 U  | 6/2015 |

(Continued)

OTHER PUBLICATIONS

International Search Report mailed May 12, 2020 for International Patent Application No. PCT/CN2019/128555.

*Primary Examiner* — Dawayne Pinkney
(74) *Attorney, Agent, or Firm* — Baker Botts LLP (57) ABSTRACT

Disclosed is a smart head-mounted device, and the smart head-mounted device comprises at least one lens and at least one arm, the arm is connected to the lens and has a cavity therein; further comprises a sound production apparatus provided inside the cavity and dividing the cavity into a front acoustic cavity and a back acoustic cavity; a sound outlet and a main sound leakage hole provided on the arm, the sound outlet is in communication with the front acoustic cavity, and the main sound leakage hole is in communication with the back acoustic cavity.

6 Claims, 7 Drawing Sheets

(51) Int. Cl.
*G02B 27/00* (2006.01)
*G02C 5/14* (2006.01)
*G02C 7/02* (2006.01)
*H04R 1/02* (2006.01)
*H04R 1/10* (2006.01)

(58) Field of Classification Search
CPC .......... G02C 5/006; G02C 11/02; G02C 5/20; G02C 5/16; G02B 27/145; G02B 27/0172; G02B 27/144; G02B 27/0101
USPC .... 351/158, 159.01, 159.75, 159.76, 159.73, 351/159.74, 178, 41, 111, 116, 121, 52, 351/119, 114, 115; 345/7, 9; 381/381, 381/327, 68.5
See application file for complete search history.

(56) References Cited

U.S. PATENT DOCUMENTS

| | | | |
|---|---|---|---|
| 2018/0294682 A1 | 10/2018 | Qui et al. | |
| 2019/0238971 A1* | 8/2019 | Wakeland | H04R 1/24 |
| 2019/0373355 A1* | 12/2019 | Lee | H04R 1/1041 |

FOREIGN PATENT DOCUMENTS

| | | | |
|---|---|---|---|
| CN | 208806979 U | | 4/2019 |
| CN | 109862496 A | * | 6/2019 |
| CN | 110554520 A | | 12/2019 |

\* cited by examiner

SMART HEAD-MOUNTED DEVICE

This application is a National Stage of International Application No. PCT/CN2019/128555, filed Dec. 26, 2019, which claims priority to Chinese Patent Application No. 201910750650.0, filed Aug. 14, 2019, both of which are hereby incorporated by reference in their entireties.

TECHNICAL FIELD

The present invention relates to the technical field of smart wear, and particularly to a smart head-mounted device.

BACKGROUND

With the development of science and technology, a smart wearable device has brought great convenience to people's lives, and a smart head-mounted device as the smart wearable device is becoming more and more popular. The smart head-mounted device may be regarded as a miniature smart device, which has corresponding functions of collecting, processing or displaying data. A user may install a program such as a software and a game provided by a software service provider in the smart head-mounted device, also perform functions such as adding schedules, map navigation, interacting with friends, taking photos and videos, and making video calls with friends through voice or motion control, and at the same time, realize wireless network access through a mobile communication network.

The manner in which a sound production apparatus on the smart head-mounted device is coupled with the human ear is preferably open. Compared with an in-ear structure that is hermetically coupled with the ear hole, the open coupling is more convenient and comfortable to wear, and can sense surrounding circumstances in real time. However, the disadvantage of the open coupling is also obvious, that is, the sound leakage is serious, which is not conducive to protecting personal privacy on the one hand, and disturbing to others on the other hand.

In view of the above, it is necessary to provide a new technical solution to solve the problem of a loud sound leakage when the sound production apparatus of the smart head-mounted device is open-coupled to the human ear.

SUMMARY

An object of the present disclosure is to provide a new technical solution of the smart head-mounted device.

According to a first aspect of the present disclosure, a smart head-mounted device is provided, comprising:
- at least one lens and at least one arm, the arm is connected to the lens and has a cavity therein;
- a sound production apparatus provided inside the cavity and dividing the cavity into a front acoustic cavity and a back acoustic cavity;
- a sound outlet provided on the arm and being in communication with the front acoustic cavity; and
- a main sound leakage hole provided on the arm and being in communication with the back acoustic cavity.

Optionally, a distance between the main sound leakage hole and the sound outlet is less than 30 mm.

Optionally, the main sound leakage hole is configured on the arm in a way that a distance between the main sound leakage hole and an ear hole of a wearer of the smart head-mounted device is greater than that between the sound outlet and the ear hole of the wearer.

Optionally, the distance between the main sound leakage hole and the ear hole of the wearer is a first distance, the distance between the sound outlet and the ear hole of the wearer is a second distance, and a difference between the first distance and the second distance is greater than 5 mm.

Optionally, the main sound leakage hole is located at a side of the sound production apparatus away from the sound outlet.

Optionally, the arm is further provided with an auxiliary sound leakage hole thereon, and the auxiliary sound leakage hole is in communication with the back acoustic cavity and is configured on the arm in a way that a distance between the auxiliary sound leakage hole and the sound outlet is greater than that between the main sound leakage hole and the sound outlet.

Optionally, the sound outlet is located on a bottom surface of the arm, and the main sound leakage hole is located on a lateral surface or a top surface of the arm.

Optionally, the auxiliary sound leakage hole is located on a bottom surface or a lateral surface of the arm.

Optionally, the arm includes a fixing section and a cooperating section, the fixing section is connected to the lens, and the cooperating section is located at an end of the fixing section away from the lens and extending curvedly relative to the fixing section; and the cavity is within the fixing section.

In the smart head-mounted device, by providing the sound outlet at a position of the arm where it is in communication with the front acoustic cavity and providing the main sound leakage hole at a position where it is in communication with the back acoustic cavity of the sound production apparatus, it is possible to create an acoustic dipole effect since the sound outlet and the main sound leakage hole have opposite phases, such that the sounds emitted by the two sound sources are canceled each other at the peripheral position of the wearer of the smart head-mounted device, therefore achieving the purpose of reducing leakage.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

DETAILED DESCRIPTION

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

Figure 1:
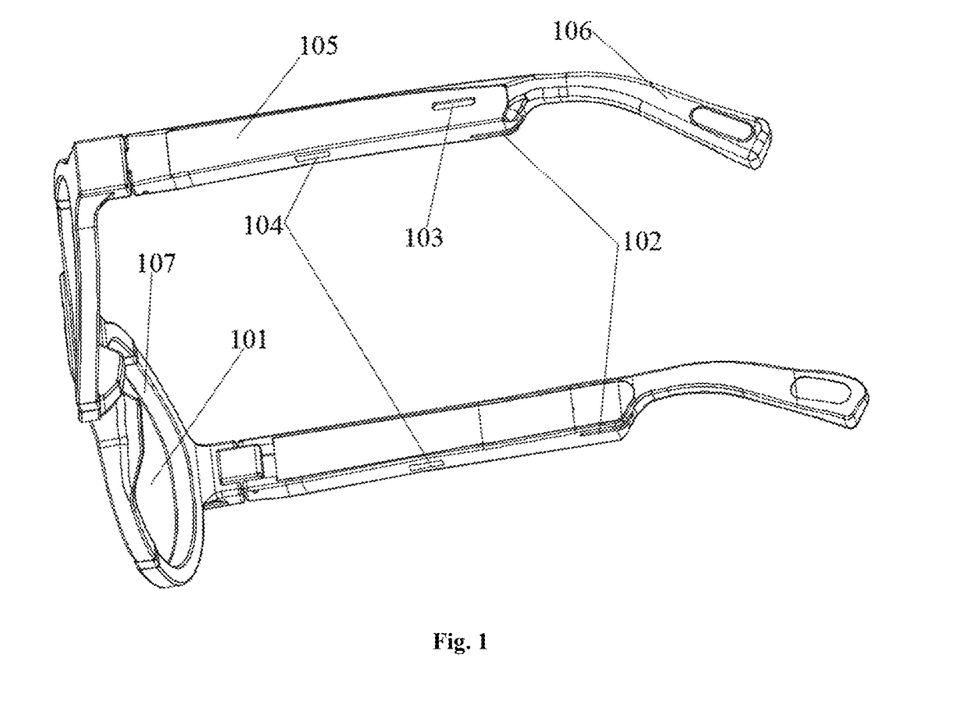
FIG. 1 shows a structural diagram of a smart head-mounted device according to a first embodiment of the present disclosure.

According to an embodiment of the present invention, a smart head-mounted device is provided. Referring to FIG. 1, the smart head-mounted device includes at least one lens 101 and at least one arm. The arm is connected with the lens 101, and has a cavity inside. The smart head-mounted device further includes a sound production apparatus, which is provided inside the cavity and divides the cavity into a front acoustic cavity and a back acoustic cavity. A sound outlet 102 and a main sound leakage hole 103 are provided on the arm, wherein the sound outlet 102 is in communication with the front acoustic cavity, and the main sound leakage hole 103 is in communication with the back acoustic cavity. The main sound leakage hole 103 and the sound outlet 102 are configured to create an acoustic dipole effect when the sound production apparatus generates sound. Specifically, the main sound leakage hole 103 and the sound outlet 102 need to create the acoustic dipole effect with respect to the surrounding people of the wearer of the smart head-mounted device, so that the sound emitted by the main sound leakage hole 103 and the sounds emitted by the sound outlet 102 are canceled each other at the peripheral position of the wearer of the smart head-mounted device.

In the smart head-mounted device of the present disclosure, by providing the sound production apparatus inside the cavity of the arm, it is possible to realize the open-coupling between the sound production apparatus and the ear hole of the wearer. Compared with the hermetical coupling of the in-ear structure, the open-coupling form is convenient and comfortable to wear with a simplified structure and aesthetically pleasing shape. The user can perceive the external dynamics in real time, which improves the safety when using the smart head-mounted device. However, the shortcomings of this open-coupling are also obvious. As the sound source spreads outward, people around the wearer will also hear the sound from the sound production apparatus of the smart head-mounted device, which on the one hand is not conducive to protecting the wearer's personal privacy, and on the other hand, interferes with others. Therefore, in the present disclosure, the sound outlet 102 is provided where it is in communication with the front acoustic cavity of the sound production apparatus, and the main sound leakage hole 103 is provided where it is in communication with the back acoustic cavity of the sound production apparatus at the same time. Since the front acoustic cavity and the back acoustic cavity are respectively located on each sides of the diaphragm of the sound production apparatus, for example, when the diaphragm vibrates towards the front acoustic cavity, the air in the front acoustic cavity is compressed, while the air in the back acoustic cavity just expands. The sound source of the front acoustic cavity (that is, the sound outlet 102) and the sound source of the back acoustic cavity (that is, the main sound leakage hole 103) have opposite phases, and thus form a positive and negative sound pressure phase, which is equivalent to creating an acoustic dipole effect. The so-called acoustic dipole refers to two sound sources that are very close to each other, and have the same vibration amplitude and opposite phases, and a synthesized sound source composed of such two point sound sources is called an acoustic dipole. Based on the anti-phase leakage reduction principle of the acoustic dipole, the smart head-mounted device of the present disclosure enables the sounds emitted by the two sound sources (that is, the sound outlet 102 and the main sound leakage hole 103) to be canceled each other at a distance, so as to achieve the purpose of leakage reduction. The condition for the sound outlet 102 and the main sound leakage hole 103 to create the acoustic dipole effect is: the distance between the sound outlet 102 and the main sound leakage hole 103 is much smaller than the distance from the above two to the ear holes of the surrounding listeners of the wearer. In this way, for the ear holes of the surrounding listeners of the wearer, the distance between the sound outlet 102 and the main sound leakage hole 103 may be negligible, that is, the distances from the two sound sources (that is, the sound outlet 102 and the main sound leakage hole 103) to ear holes of the surrounding listeners of the wearer are approximately equal. Therefore, such two sound sources with opposite phases are canceled each other when they reach the ear holes of the surrounding listeners of the wearer, so as to achieve the purpose of leakage reduction.

In one embodiment, the distance between the main sound leakage hole 103 and the sound outlet 102 is less than 30 mm. For people around the wearer, the smaller the sound leakage, the better, that is, the effect of an acoustic dipole can be created between the main sound leakage hole 103 and the sound outlet 102, which requires that the distance between the main sound leakage hole 103 and the sound outlet 102 should not be too far. Based on the actual use of the glasses, it is found that the effect of eliminating sound leakage is the best when the distance between the main sound leakage hole 103 and the sound outlet 102 is less than 30 mm.

In one embodiment, the distance between the main sound leakage hole 103 and the wearer's ear hole is greater than the distance between the sound outlet 102 and the wearer's ear hole. For the wearer, the anti-phase sound wave of the main sound leakage hole 103 will weaken the loudness of the sound received by the ear. That is to say, the sound wave emitted by the main sound leakage hole 103 will partially cancel the sound wave emitted by the sound outlet 102, thereby exerting a bad influence on the listening effect of the wearer. In order to reduce this weakening effect, it is found that the distance between the main sound leakage hole 103 and the ear needs to be greater than the distance between the sound outlet 102 and the ear.

In one embodiment, the distance between the main sound leakage hole 103 and the wearer's ear hole is defined as a first distance, the distance between the sound outlet 102 and the wearer's ear hole is defined as a second distance, and the difference between the first distance and the second distance is greater than 5 mm. It is found that when the difference between the above two distances is greater than 5 mm, the sound outlet 102 and the main sound leakage hole 103 do not meet the conditions for creating the sound dipole effect with respect to the wearer's ear hole, so the impact on the wearer can be reduced. That is to say, for the people around the wearer, the sound outlet 102 and the main sound leakage hole 103 create the acoustic dipole effect so as to reduce the sound leakage. The sound outlet 102 and the main sound leakage hole 103 cannot create the acoustic dipole effect, so as not to influence the listening effect of the wearer.

In one embodiment, the main sound leakage hole is located on a side of the sound production apparatus away from the sound outlet. That is, the main sound leakage hole and the sound outlet are respectively located on each side of the sound production apparatus, and such a positional relationship ensures that the sound outlet is in communication with the front acoustic cavity of the sound production apparatus and the main sound leakage hole is in communication with the back acoustic cavity of the sound production apparatus.

Figure 2:
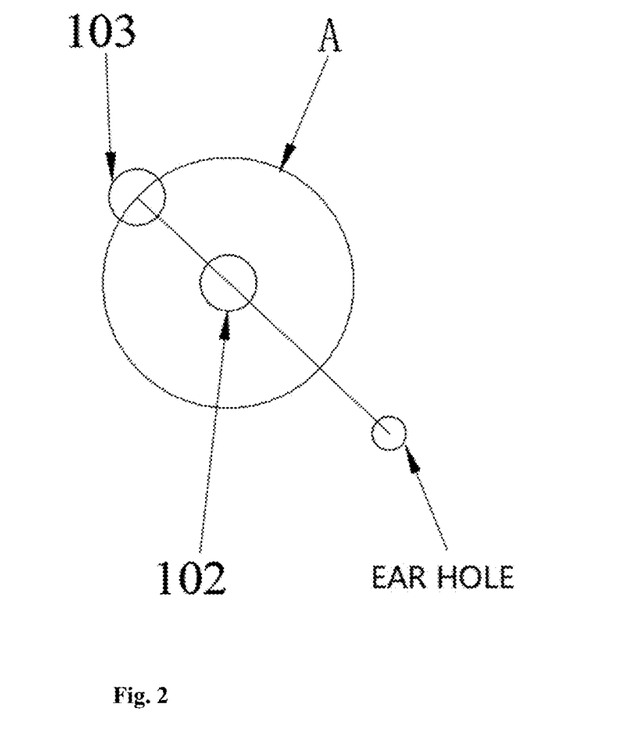
FIG. 2 shows a schematic diagram of the positions of a main sound leakage hole and a sound outlet in the smart head-mounted device of the present invention as well as the position of an ear hole of a wearer.
Figure 3:
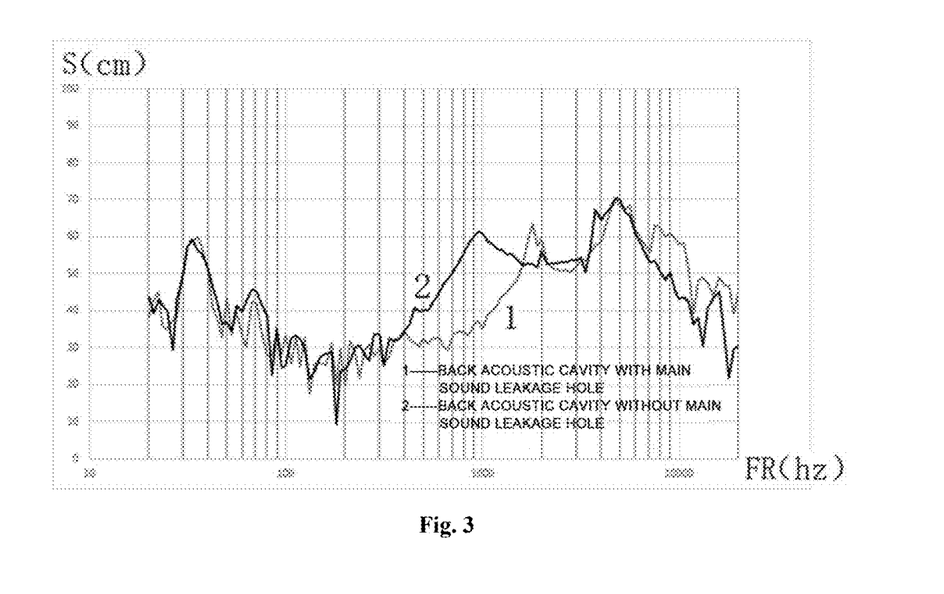
FIG. 3 shows a frequency response curve of sound leakage at a position 30 cm from the side of the wearer.

In one embodiment, the main sound leakage hole 103, the sound outlet 102 and the ear hole of the wearer are located on a straight line, so as to achieve an optimal design. Referring to FIG. 2, assuming that the distance between the main sound leakage hole 103 and the sound outlet 102 is just L mm, then, only when the main sound leakage hole 103, the sound outlet 102 and the ear hole of the wearer are located on a straight line, the distance difference between the distance from the main sound leakage hole 103 to the ear hole of the wearer and the distance from the sound outlet 102 to the ear hole of the wearer is at most L mm. When the above three are not on a straight line, for example, when the main sound leakage hole is at the position A of the figure, the distance difference between the distance from the main sound leakage hole 103 to the ear hole of the wearer, and the distance from the sound outlet 102 to the ear hole of the wearer, is smaller than L mm.

In one embodiment, the arm is further provided with an auxiliary sound leakage hole 104 which is in communication with the back acoustic cavity, and the distance between the auxiliary sound leakage hole 104 and the sound outlet is greater than that between the main sound leakage hole 103 and the sound outlet. Since the main leakage hole 103 is provided in the back acoustic cavity, two sound sources are actually formed for the wearer. Since the front acoustic cavity and the back acoustic cavity are different in structure, the two acoustic cavities will form a high-frequency cutoff frequency (FH) at different locations, which causes the frequency response (FR) curve to form a bimodal structure at the high frequency. By providing the auxiliary sound leakage hole additionally, the two peaks can be combined into one. By providing the auxiliary sound leakage hole 104 connected to the back acoustic cavity and adjusting the frequency response (FR) curve of the main sound leakage hole 103 with the auxiliary sound leakage hole 104, the high frequency cutoff frequency (FH) of the main sound leakage hole 103 and the high frequency cutoff frequency (FH) of the sound outlet 102 are close to or consistent, thereby improving the sound effect.

Figure 4:
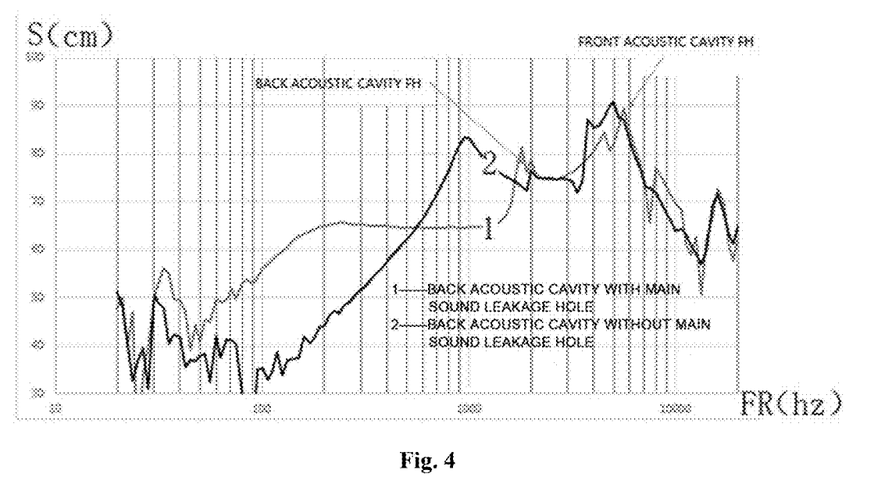
FIG. 4 shows a frequency response curve received by an ear canal of the wearer.
Figure 5:
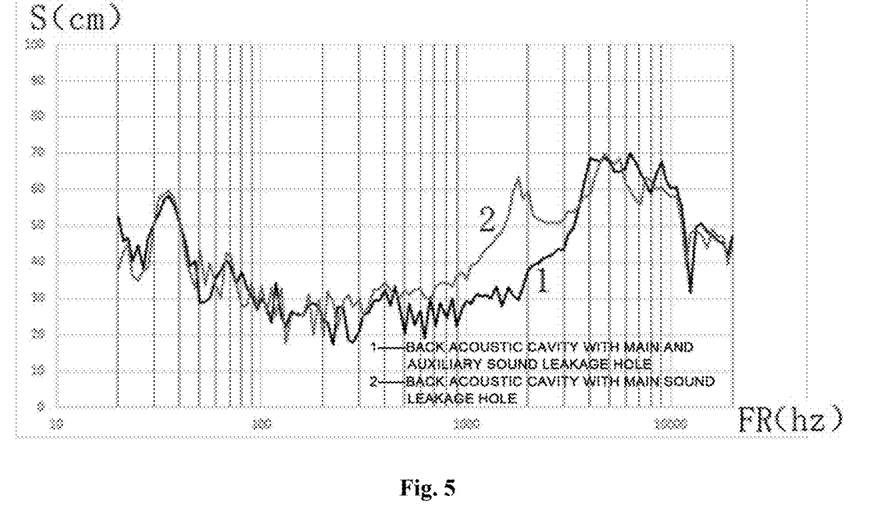
FIG. 5 shows a comparison diagram of the frequency response curve of the sound leakage at a position 30 cm away from the side of the wearer in two cases with or without an auxiliary sound leakage hole in the back acoustic cavity.
Figure 6:
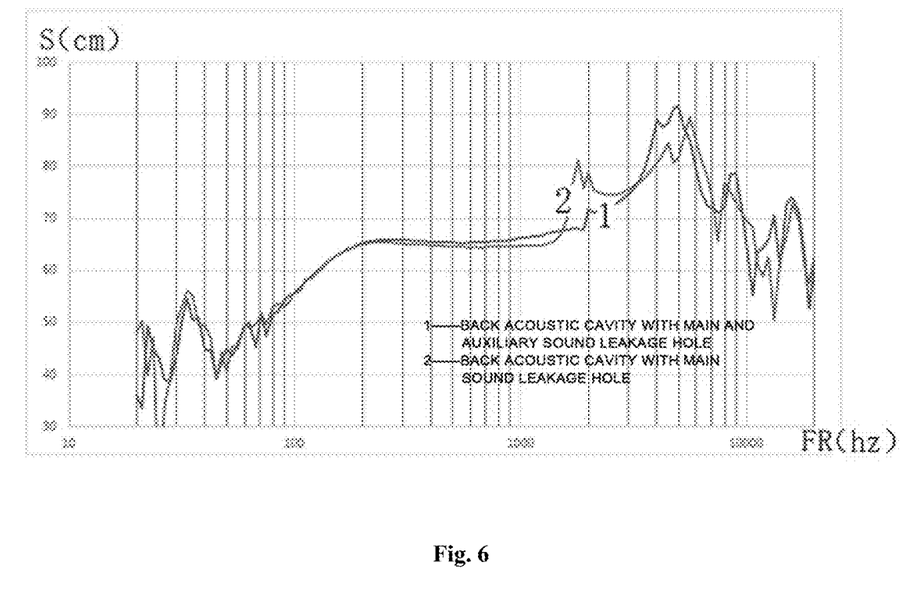
FIG. 6 shows a comparison diagram of the frequency response curves received by the ear hole of the wearer in two cases with or without an auxiliary sound leakage hole in the back acoustic cavity.

Referring to FIG. 3 to FIG. 6 (S in FIG. 3 to FIG. 6 represents a position S cm away from the side of the wearer), it is found that additionally providing the main sound leakage hole 103 in the back acoustic cavity can not only significantly reduce sound leakage (See FIG. 3), and can also significantly reduce the resonant frequency (FO) and improve low frequency sensitivity (see FIG. 4). Moreover, providing the auxiliary sound leakage hole 104 can form only a peak at high frequencies (see FIGS. 5 and 6).

In one embodiment, the main sound leakage hole 103 and the auxiliary sound leakage hole 104 are both slit-shaped, and the size of both is not more than 1.5*8 $mm^2$, and preferably, the auxiliary sound leakage hole 104 is smaller in size than the main sound leakage hole 103. In other embodiments, the main sound leakage hole 103 and the auxiliary sound leakage hole 104 may also have other shapes, such as a circle.

Figure 7:
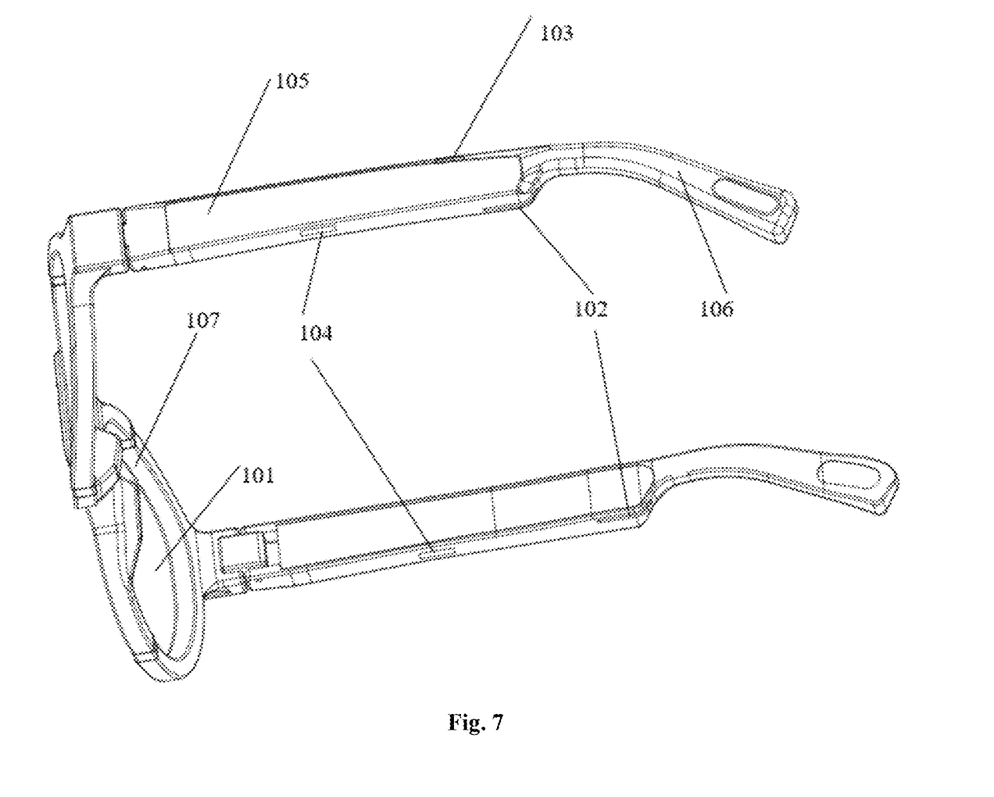
FIG. 7 shows a structural diagram of a smart head-mounted device according to a second embodiment of the present disclosure.
Figure 8:
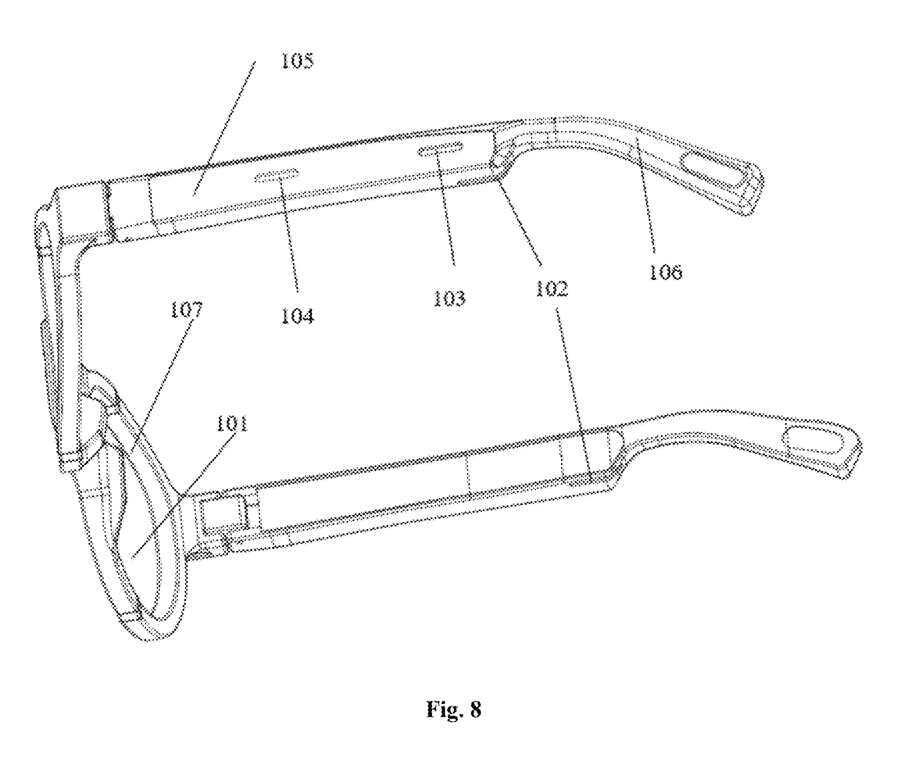
FIG. 8 shows a structural diagram of a smart head-mounted device according to a third embodiment of the present disclosure.
Figure 9:
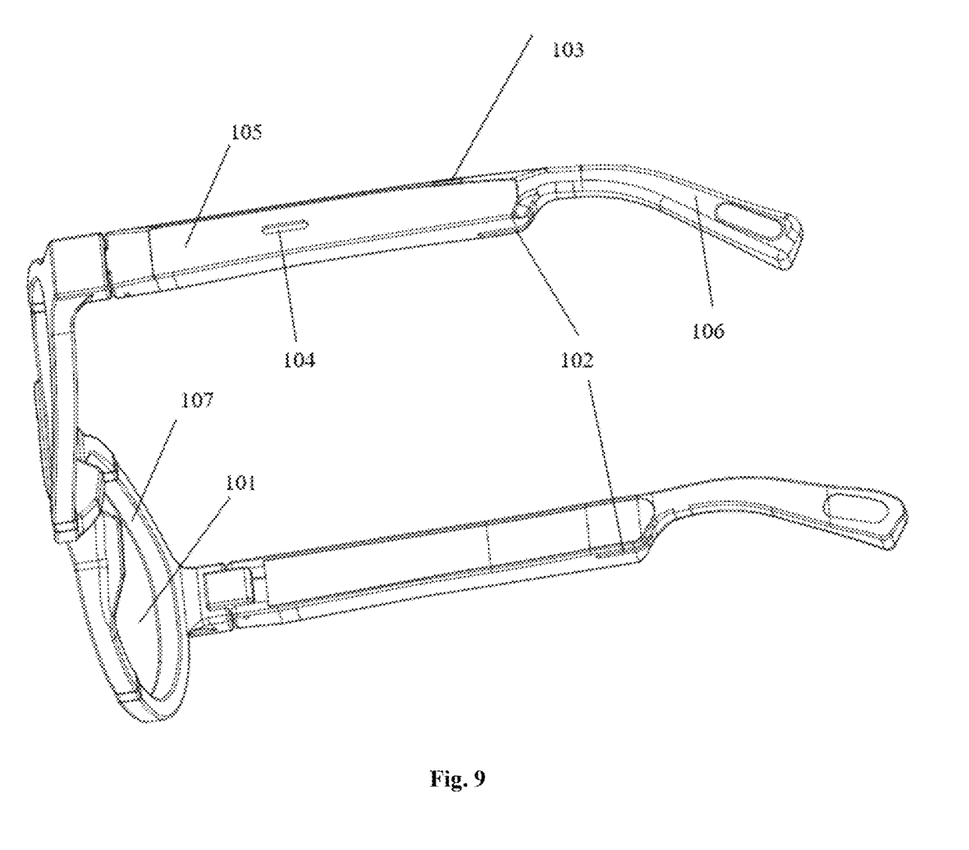
FIG. 9 shows a structural diagram of a smart head-mounted device according to a fourth embodiment of the present disclosure.

In one embodiment, the sound outlet 102 is located on the bottom surface of the arm, the main sound leakage hole 103 is located on the lateral surface of the arm, and the auxiliary sound leakage hole 104 is relatively flexible in terms of positions, and may be provided on the bottom surface of the arm as shown in FIGS. 1 and 8, or on the lateral surface of the arm as shown in FIGS. 7 and 9, as long as the auxiliary sound leakage hole 104 is provided at the position communicating with the back acoustic cavity and can achieve the effect of adjusting FR and FH. The "bottom surface" and "lateral surface" refer to the following situations: in the case of the working state of the smart head-mounted device, the downward surface of the arm is the bottom surface, and this surface is also the surface that contacts the wearer's pinna and its extension; and the surface of the arm that is adjacent to the bottom surface and outwards is the lateral surface.

In one embodiment, see FIG. 1, the arm includes a fixing section 105 and a cooperating section 106, wherein the fixing section 105 is connected with the lens 101, and the cooperating section 106 is located at one end of the fixing section 105 away from the lens 101 and is bent relative to the fixing section 105. The cavity is located within the fixing section 105. In this embodiment, the reason why the cooperating section 106 is bent relative to the fixing section 105 is to more conveniently hang the cooperating section 106 on the wearer's ear and form a stable connection with the wearer's ear. In this embodiment, the sound outlet 102 is provided at the position of the fixing section 105 close to the cooperating section 106 and extends from the fixing section 105 to the cooperating section 106, and based on the working state of the smart head-mounted device, the sound outlet 102 is provided on the bottom surfaces of the fixing section 105 and the cooperating section 106, and the main sound leakage hole 103 is provided on the lateral surface adjacent to the bottom surface, so that it enables the main sound leakage hole 103, the sound outlet 102 and the ear hole of the wearer to be on a straight line.

In one embodiment, the smart head-mounted device further includes at least one frame 107 configured to fix the lens 101, and the arms are connected to the frame 107. In one embodiment, the arms are movably connected to the frame 107, and can be folded relative to the frame 107 for easy storage. When the arm includes the fixing section 105 and the cooperating section 106, specifically, the fixing section 105 is movably connected to the frame 107. Normally, two lenses 101 and two arms are symmetrically arranged in the smart head-mounted device, and the two lenses 101 are respectively fixed by the single frame 107. At this time, the sound outlet 102, the main sound leakage hole 103, and the auxiliary sound leakage hole 104 are symmetrically arranged on the two arms.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A smart head-mounted device, comprising:
   at least one lens and at least one arm, wherein the arm is connected to the lens and has a cavity therein;
   a sound production apparatus provided inside the cavity and dividing the cavity into a front acoustic cavity and a back acoustic cavity;
   a sound outlet provided on the arm and being in communication with the front acoustic cavity; and
   a main sound leakage hole provided on the arm and being in communication with the back acoustic cavity,
   wherein the main sound leakage hole is configured on the arm in such that a distance between the main sound leakage hole and an ear hole of a wearer of the smart head-mounted device is greater than a distance between the sound outlet and the ear hole of the wearer,
   wherein the sound outlet is located on a bottom surface of the arm, and the main sound leakage hole is located on a lateral surface or a top surface of the arm, and
   wherein the arm is further provided with an auxiliary sound leakage hole thereon, and the auxiliary sound leakage hole is in communication with the back acoustic cavity and located on a bottom surface or a lateral surface of the arm.

2. The smart head-mounted device of claim 1, wherein a distance between the main sound leakage hole and the sound outlet is less than 30 mm.

3. The smart head-mounted device of claim 1, wherein the distance between the main sound leakage hole and the ear hole of the wearer is a first distance, the distance between the sound outlet and the ear hole of the wearer is a second distance, and a difference between the first distance and the second distance is greater than 5 mm.

4. The smart head-mounted device of claim 1, wherein the main sound leakage hole is located at a side of the sound production apparatus away from the sound outlet.

5. The smart head-mounted device of claim 1, wherein the auxiliary sound leakage hole is configured on the arm such that a distance between the auxiliary sound leakage hole and the sound outlet is greater than that between the main sound leakage hole and the sound outlet.

6. The smart head-mounted device of claim 1, wherein the arm comprises a fixing section and a cooperating section, the fixing section is connected to the lens, and the cooperating section is located at an end of the fixing section away from the lens and extending curvedly relative to the fixing section; and
   wherein the cavity is within the fixing section.

* * * * *